US007382867B2

(12) United States Patent
Smith et al.

(10) Patent No.: US 7,382,867 B2
(45) Date of Patent: Jun. 3, 2008

(54) VARIABLE DATA VOICE SURVEY AND RECIPIENT VOICE MESSAGE CAPTURE SYSTEM

(75) Inventors: Scott R. Smith, Chicago, IL (US); James E. O'Hara, Winnetka, IL (US); Brian C. Kipp, Gilbert, AZ (US)

(73) Assignee: Extended Data Solutions, Inc., Chicago, IL (US)

( * ) Notice: Subject to any disclaimer, the term of this patent is extended or adjusted under 35 U.S.C. 154(b) by 0 days.

(21) Appl. No.: 11/735,863

(22) Filed: Apr. 16, 2007

(65) Prior Publication Data

US 2007/0201630 A1 Aug. 30, 2007

Related U.S. Application Data

(63) Continuation-in-part of application No. 10/844,928, filed on May 13, 2004, now Pat. No. 7,206,390.

(51) Int. Cl.
*H04M 1/64* (2006.01)
(52) U.S. Cl. .............................. 379/88.04; 379/68.17; 704/251
(58) Field of Classification Search ............. 379/88.04, 379/88.17; 704/251
See application file for complete search history.

(56) References Cited

U.S. PATENT DOCUMENTS 5,644,624 A * 7/1997 Caldwell ..................... 379/69

| 5,737,725 | A | 4/1998 | Case |
| 5,758,323 | A | 5/1998 | Case |
| 5,832,060 | A | 11/1998 | Corlett et al. |
| 6,161,092 | A | 12/2000 | Latshaw et al. |
| 6,411,685 | B1 * | 6/2002 | O'Neal .................... 379/88.14 |
| 6,873,952 | B1 * | 3/2005 | Bailey et al. ............... 704/251 |
| 6,983,249 | B2 * | 1/2006 | Sakai ........................ 704/258 |

\* cited by examiner

*Primary Examiner*—Gerald Gauthier
(74) *Attorney, Agent, or Firm*—Perry Hoffman

(57) ABSTRACT

Personalized voice survey delivery systems and methods in which a computer identifies a person to be surveyed, including his or her phone number or Internet login to a specific website, or email address, together with specific identifiers for the person, such as the person's name. The person's phone number is dialed and when the call is answered, the computer concatenates the files having the digitized identifiers such as the person's name, with the file that is the standard message to be delivered as the initial survey content. Computer-generated personalized voice messages are created by concatenating data files of audio that were pre-recorded in the voice of an individual whose live voice is to be simulated during the delivery of the voice survey. The audio signal that is produced from the concatenated data files, one of which is a pre-recorded voice phrase corresponding to the identifier, another of which is a standard message, the resultant audio message sent to the called number sounds as if the calling party is the political office holder, celebrity, or candidate, addressing the called party directly, as if during a live telephone survey by the political office holder, celebrity, or candidate. The event of the person logging into a specific website or clicking a link in an email can be substituted for dialing the person's phone number.

30 Claims, 4 Drawing Sheets

VARIABLE DATA VOICE SURVEY AND RECIPIENT VOICE MESSAGE CAPTURE SYSTEM

CROSS-REFERENCE TO RELATED APPLICATION

This application is a continuation-in-part of U.S. patent application Ser. No. 10/844,928 filed on May 13, 2004 now U.S. Pat. No. 7,206,390 issued Apr. 17, 2007, the entire disclosure of which is incorporated herein by reference.

FIELD OF INVENTION

This invention relates generally to broadcast voice messaging systems and methods, and more particularly to methods and systems for computerized telephone survey automation.

BACKGROUND OF THE INVENTION

Computerized calling, or "broadcast voice messaging" systems, are known, as are computerized telephone survey systems. Such prior art systems can automatically dial a list of phone numbers, detect the called phone go off hook and then generate a voice message to the called number. Telephone survey systems allow call recipients to press telephone keys to indicate responses to each question. Broadcast voice messaging systems typically deliver the same, single voice message to each recipient, whether the message be associated with a telephone survey, or an outgoing message only.

Some broadcast voice messaging systems can personalize the content of the message delivered, using text-to-speech engines. A limitation or short coming of prior art computerized calling systems is that they sound like computers. They are therefore limited in that they can either deliver a single generic message, or the personalized content sounds like a computer. A computer-generated voice message system that delivered personalized, life-like messages would be an improvement over the prior art. Some telephone survey systems can include "branching logic" which changes the subsequent question based on the recipient's previous response. A limitation or short coming of the prior art computerized telephone survey system is that they cannot interact in a lifelike, personalized fashion with the survey recipient, which makes the survey recipient much more likely to complete the survey.

A further limitation of prior art computerized telephone survey systems is that the survey recipients are not afforded the opportunity to provide spoken feedback to the survey.

SUMMARY OF THE INVENTION

There is provided a system and method of delivering a voice survey by telephone or the Internet by which a computer concatenates wav files or other types of audio files and plays the concatenated files to the recipient in such a way that the resultant audio sounds as if the caller was speaking personally and directly to the intended recipient. Following the initial voice message, the recipient can indicate specific responses by pressing keys on the telephone key pad or via another interface, such as an Internet software interface.

A caller, such as a political office holder, a celebrity or other known personality, or a candidate for political office, pre-records voice phrases by speaking each phrase into a recording device. Each spoken phrase is digitized and the digitization of the voice rendering stored in a data file. An informational or content message is spoken by the political office holder, a celebrity, or a candidate and it too is digitized and stored in a file. The event of the person logging into a specific website or clicking a link on a website or in an email can be substituted for dialing the person's phone number. For instance, if the person is on a website completing a purchase, a button may be presented asking if they are willing to take a survey. Upon clicking a link to indicate they will take the survey, the "call is placed" over the Internet from the website to the person's computer and the process continues in the same manner as described when a telephone call is placed. In this case, identifiers of the person may be included.

To deliver a personalized voice survey, a computer identifies a person to be surveyed, including his or her phone number or Internet login to a specific website, or email address, together with specific identifiers for the person, such as the person's name. The person's phone number is dialed and when the call is answered, the computer concatenates the files having the digitized identifier(s)—such as the person's name, with the file that is the standard message to be delivered. The audio signal that is produced from the concatenated data files, one of which is a pre-recorded voice phrase corresponding to the identifier, another of which is a standard message, the resultant audio message sent to the called number sounds as if the calling party is the political office holder, celebrity, or candidate, addressing the called party directly, as if during a live call by the political office holder, celebrity, or candidate. The event of the person logging into a specific website or clicking a link in an email can be substituted for dialing the person's phone number.

BRIEF DESCRIPTION OF THE DRAWINGS

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention. In the drawings, wherein like reference numeral indicate like parts.

DETAILED DESCRIPTION OF THE EMBODIMENTS

Figure 1A:
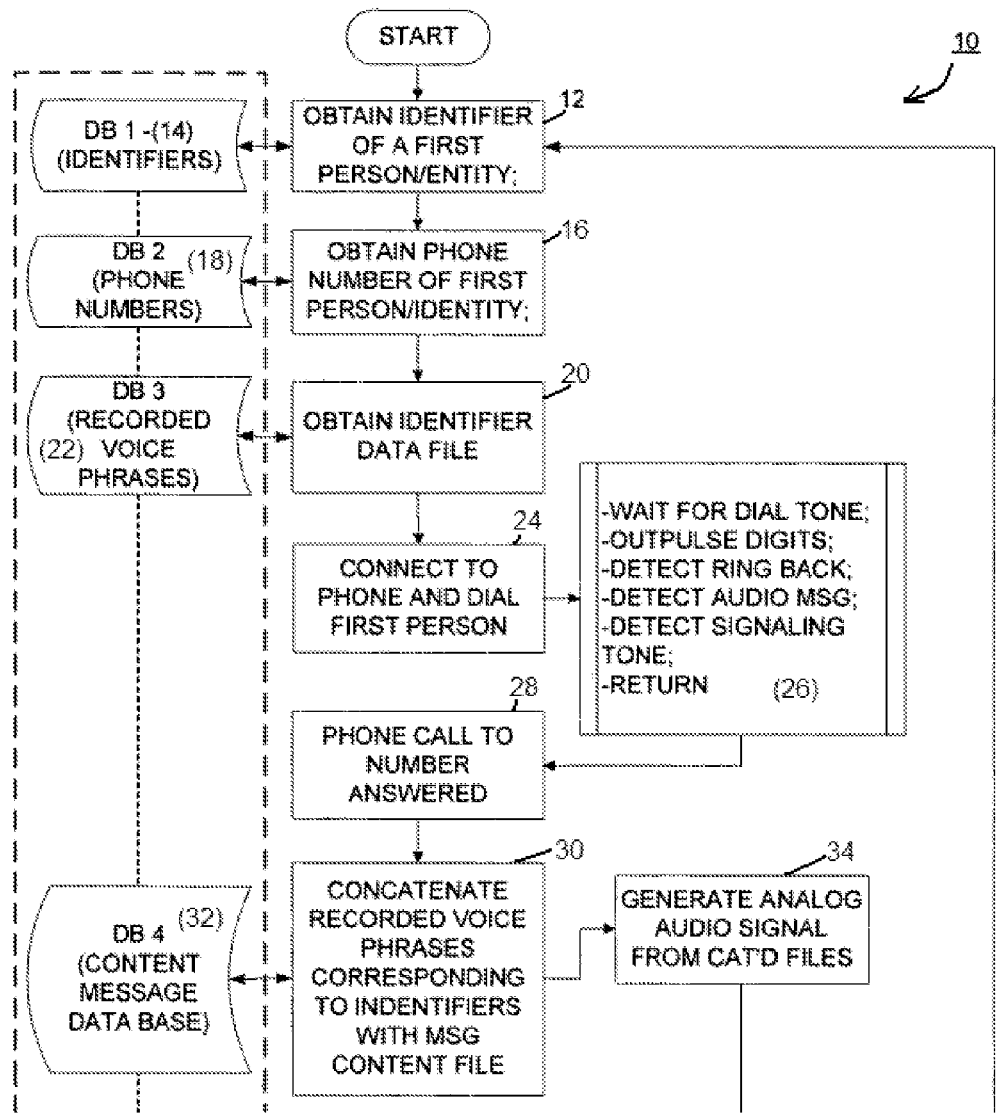
FIGS. 1A, 1B and 1C are flow charts for methods by which a person's voice can be simulated for variable voice survey broadcast by concatenating voice files, and subsequently methods by which the recipient's voice message can be captured for later review in accordance with the inventions.
Figure 1B:
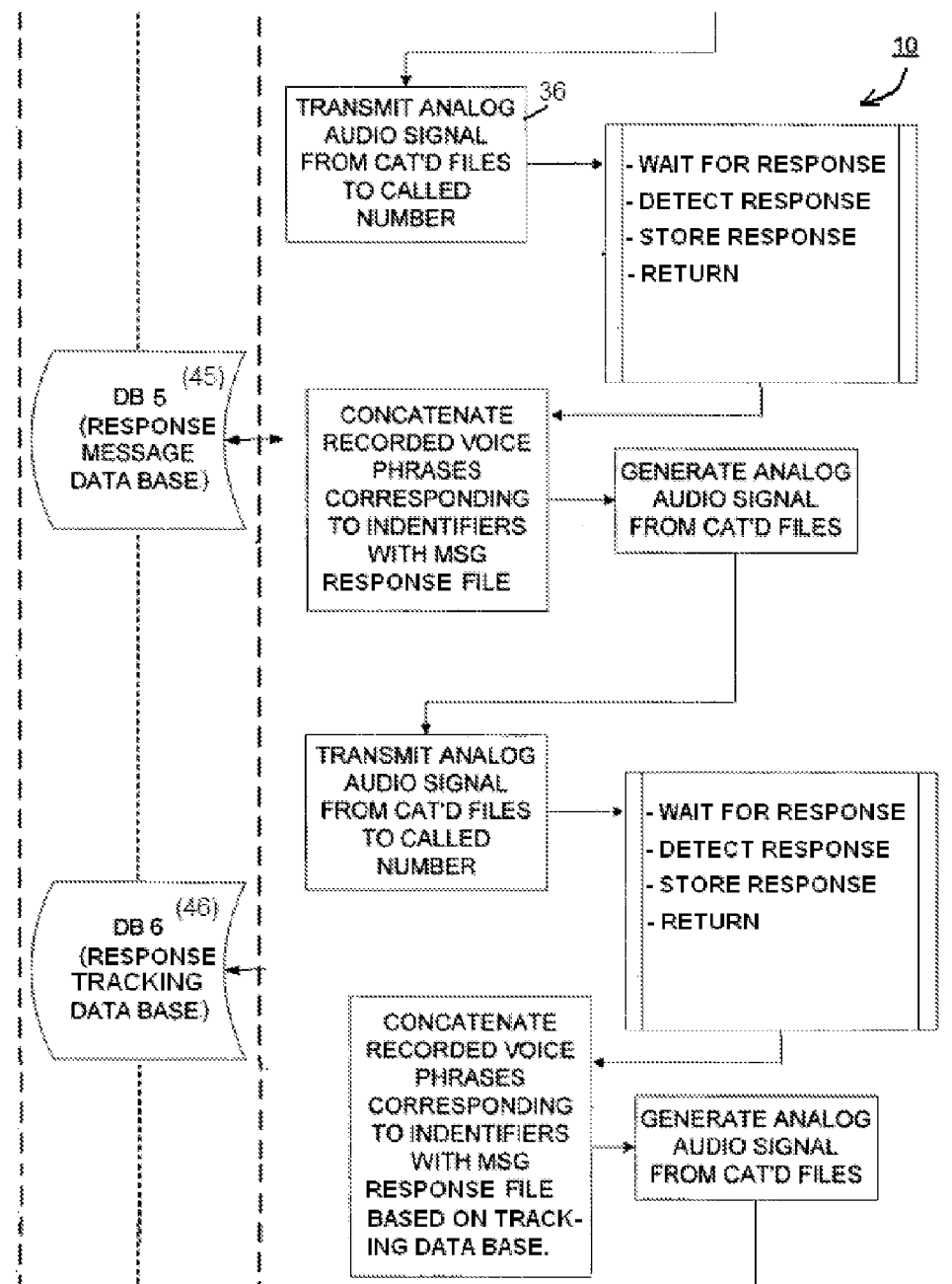
Figure 1C:
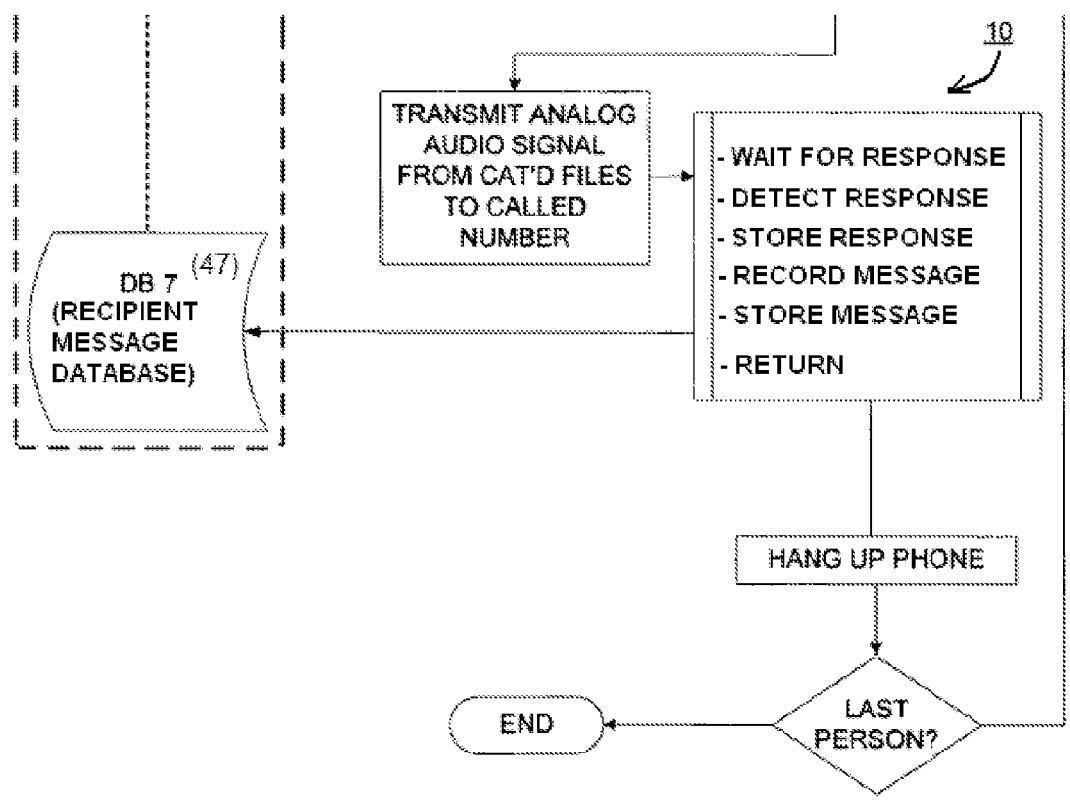

FIG. 1 depicts steps of a method 10 by which a variable voice survey can be delivered to one person in the voice of another person by concatenating data files that represent speech of a person who records voice messages and creating audio from the concatenated data files in such a way that the generated audio impersonates the person who recorded the message. In the preferred embodiment, two or more wav files are concatenated and processed to generate an audio signal that is a voice message to the called person. The voice message to the called person includes words and sentences, i.e., "recorded voice phrases" in the voice of the calling person. The components may include the use of the called person's name, or other identifier. By concatenating wav files that correspond to an identifier of the called person, the computer-generated audio message impersonates a calling person's voice and attributes such that the message sounds as if the message were personally made to the person who was called. The steps of the method 10 depicted in the figures are performed by one or more computers, such as the computer and system shown in FIG. 3.

In step 12, program instructions executed by a processor that cause a processor to read a name or other identifiers of a person to be called from a data base 14 of called party identifiers. An "identifier" of a person to be called can include a person's name. Other identifiers of persons to be called would include a person's address, a postal zip code but could also include a geographic area in which a person lives; his or her age; his or her race; gender; occupation or profession; education level; income; marital status; family status, religion, corporate or group affiliations, special interests and/or purchase habits. All such factors should be considered demographic characteristics of persons to be called.

Table 1 below shows a sample of some identifiers that can be in the first data base DB 1.

| First Name | City | Election Date | District |
|---|---|---|---|
| John | Chicago | March 16th | 18th |
| Jane | Evanston | April 5th | 24th |
| Scott | Rockford | May 20th | 31st |

A date and time can also be identifiers and term "identifier" should be construed to include all of the foregoing demographic characteristic but also a date and time. Inasmuch as a date and time can be identifiers, they can certainly be repeatedly copied into a data base from which they can be read as is any other identifier. A more expedient way to obtain date and time however is from the computer's internal clock.

After an identifier of a person to be called is obtained in step 12, a phone number or website login for the identified person is obtained in step 16 from a second data base 18 of phone numbers and logins.

Table 2 below shows a sample of first and last names, associated phone numbers and addresses in the second data base DB 2.

| First Name | Last Name | Address | Phone Number |
|---|---|---|---|
| John | Johnson | 111 Main Street | 312-555-5555 |
| Jane | Jones | 222 Elm Lane | 708-666-6666 |
| Scott | Smith | 333 Oak Avenue | 847-777-7777 |

Although FIG. 1 shows that the data base 14 (DB 1) of identifiers is separate from the data base 18 (DB 2) of phone numbers and logins, these two data bases (DB 1 and DB 2) could be different parts of the same logical data base. In addition, the depiction of DB 1 and DB 2 in FIG. 1 should not be construed to require that DB 1 and DB 2 be on different storage media.

The step 16 of obtaining a phone number or login for a person identified in step 12 can be readily accomplished using an electronic telephone book. Regardless of how a person was first identified in step 12, e.g., by alphabetic order, address or other demographic characteristic, that person's name can often be found in published or purchased alphabetical telephone directories, customer databases or voting records.

In the preferred embodiment, step 16 is accomplished by looking up a phone number for a person identified in step 12 in a commercially-available electronic telephone directory which also contains the person's name, address and all other identifiers (age, income, interests, etc.).

After one or more identifiers for a person to be called are obtained and the phone number for that person is obtained, in step 20, a recorded voice phrase wav file corresponding to the identifiers by which the person was identified (in step 12) is obtained in step 20 from a third data base 22 of wav files (DB 3). The wav file obtained from the third data base 22 is a digital representation of a person speaking content corresponding to the identifier such that when the wav file is "played" a person's voice is reproduced, which sounds like the person speaking a phrase associated with the identifier.

Table 3 below shows how the third data base DB 3 can be organized.

| Phrase Filename | Indentifer Field | Matching Indentifier Value |
|---|---|---|
| John.wav | Firstname | John |
| Jane.wav | Firstname | Jane |
| Scott.wav | Firstname | Scott |
| Chicago.wav | City | Chicago |
| Evanston.wav | City | Evanston |
| Rockford.wav | City | Rockford |
| March16.wav | Election Date | March 16th |
| April5.wav | Election Date | April 5th |
| May20.wav | Election Date | May 5th |
| 18th.wav | District | 18th |
| 24th.wav | District | 24th |
| 31st.wav | District | 31st |

If a person's first name was the basis by which he or she was identified, and it was determined that his first name is "John," the Phrase Filename entry for the identifier "John" will either be an audio file, such as a wav file, or a pointer to where a corresponding wav file can be located in memory.

If for example, the identifier used step 12 is a person's first name, the data file obtained in step 20 from the third data base 22 will be a wav file that is a digitization of someone speaking the identified person's first name. If the person to whom a message is to be delivered is named "John" and the person who is ostensibly calling for "John" is a candidate for political office, the wav file obtained in step 20 from the third data base 22 will be the candidate saying the name "John" in the candidate's own voice. If the person ostensibly calling "John" is a celebrity, the wav file obtained in step 20 will be the celebrity saying "John" in the celebrity's own voice.

In some instances, the third data base 22 of recorded voice phrases will not have a file corresponding to a given identifier. Inasmuch as the inventive concept disclosed and claimed herein is directed to simulating natural voice by concatenated voice files, if an identifier for a person or persons is not available in step 20, the method is aborted for that identifier. If at step 20 there is no identifier, program control should therefore stop at step 20, or branch back to step 12 for the next person to be identified in step 12. If there is a data file in the third data base 22 (DB 3) for the person who was identified in step 12, the rest of the method 10 steps can be completed. Program control thereafter proceeds to step 24.

In one embodiment, "generic voice phrases" can be inserted if there is no match between an identifier and digitized rendition of the identifier. If the person's name is not common, a substitute wave file will be substituted which, when inserted, continues to simulate natural voice. For instance, the greeting "Hi John" would be substituted with "Hi"; the phrase "I will work to add jobs through small business incentives and lower taxes for all citizens, especially those living in the 24th District." will be substituted with "I will work to add jobs through small business incentives and lower taxes for all citizens." The latter is accomplished by substituting a short, silent wave file for the personalized clip. ("especially those living in the 24.sup.th District" will be "_" . . . and the resulting message still sounds natural.)

At step 24, a telephone call to the identified person is attempted by the computer. As is known, several steps are performed to automatically place a call.

FIG. 1 shows step 26 as having several separate steps that need to be performed. The computer placing the call must have some control over the telephone or telephone line by which the call will be placed. In the case of plain old telephone service or POTS, there is a finite amount of time that elapses after the phone goes "off hook" and a dial tone is detected. In step 26, the computer will wait for a dial tone, after which it will out pulse the phone number being called.

The "ring back" is a tone provided to a calling party to inform the calling party that the called number telephone is detected as ringing. After the ring back is detected in step 26, the called number will usually be answered, by a telephone answering system or a live person. The computer detects when the called number is answered, usually by the called number going off hook but also by the cessation of the ring back tones, after which the computer needs to determine whether the number was answered by a machine or a live person.

In the preferred embodiment, the method depicted in FIG. 1 determines whether the number was answered by a machine or live person and produces a slightly different voice message for each case, by concatenating different recorded voice phrases and/or standard message content.

Pre-recorded speech used in voice mail systems and the recorded audio announcement commonly used with answering machines and the live speech of a live human can be differentiated by a computer using methods that are well-known in the art. The differentiation of a live person's voice from a machine is not germane to the invention disclosed and claimed herein.

At step 30, after the called number is determined to have been answered in step 28, program control proceeds to step 30 whereat the computer concatenates the data file obtained in step 20, with a second data file obtained from a content message data base 32 (DB 4). For purposes of claim construction, the term "concatenate" should be construed to mean a logical joinder or linkage of the two data files, both of which are digitized speech files, such as wav files, of the voice of a person who is ostensibly placing a call to the person identified in step 12.

Table 4 below shows a sample of content messages that are digitized and stored in the fourth data base DB 4

| | | |
|---|---|---|
| ThisIsTim.wav | Message Introducing Candidate | "This is Tim Simpson, candidate for U.S. Senate." |
| JobsTaxes.wav | Message appealing to increasing job growth and lowering taxes | "As your next U.S. Senator, I will work to add jobs through small business incentives and lower taxes for all citizens." |
| Question1.wav | Asking recipient if they will vote | "Can I count on your vote next Tuesday? If so, please press 1 now. If you're undecided press 2. If you are voting for another candidate, please press 3 now." |

Inasmuch as it is an object of the invention to simulate a person's actual voice, it is important that data files that contain data that represents speech be processed appropriately so that the speech that is rendered from data files sounds natural. Clarifying the term "concatenate," it should be understood that the first data file that was identified in step 20 will produce speech when it's processed into an audio signal. A content message obtained in step 30 from a data base will produce recognizable speech when it's processed. When these two audio signals are played in sequence, i.e., one after the other, the resultant audio signal should sound as if it was spoken by the person whose voice is being impersonated by the computer's concatenation of different data files, each of which represent one or more words or phrases spoken by the calling party.

In step 34, after the telephone call is answered and after the data files that will comprise a message to be sent are concatenated, an audio signal, produced from concatenated data files, is transmitted to the called person over the telephone link that extends to the called person's telephone or answering system.

Table 5 below shows a phone number of a person to be called, files that are concatenated from the data bases and finally, a text representation of what the spoken message from the concatenated files would include when it's transmitted to the called person.

| Phone Number | Concatenation | Resulting Message Content |
|---|---|---|
| 312-555-5555 | 1. John.wav<br>2. ThisIsTim.wav<br>3. Chicago.wav<br>4. JobsTaxes.wav<br>5. 18th.wav<br>6. Question1.wav | "Hi John. This is Tim Simpson, candidate for U.S. Senate. I'm calling Chicago residents today to introduce myself and get your feedback. As your next U.S. Senator, I will work to add jobs through small business incentives and lower taxes for all citizens, especially those living in the 18th District. Can I count on your vote next Tuesday? If so, please press 1 now. If you're undecided press 2. If you are voting for another candidate, please press 3 now." |

For purpose of claim construction, the term "transmitted" should be construed to include any method by which the audio created from the data files is sent to the called number. In the case of audio that is stored as a wav file, an analog signal, i.e., an audio signal, is generated from a wav file using techniques that are known in the art. In the case of a POTS call, audio from the wav files is generated by the computer and output to the telephone line onto which the DTMF tones that represent the called number were transmitted. The analog signal from the wav files is sent to the called number via the telephone network over which the call was routed. In the case of a call placed from a cellular or other wireless network, or even Voice Over Internet Protocol or VoIP, the term "transmitted" should be construed to include the digital representations of the audio signal created from the wav files but which is digitally processed during the course of a call handled by a wireless telephone service or a data network, such as the Internet. Further, upon clicking a link to indicate they will take the survey, the "call" may be via the Internet from the website to the person's computer and the process continues in the same manner as described when a telephone call is placed. In the case of a call placed during the course of a website session, the term "transmitted" should be construed to include the digital representations of the audio signal created from the wav files but which is digitally processed during the course of a call handled a data network such as the Internet.

In the preferred embodiment, one identifier of a first person obtained in step 12 was a person's name. Both first and last names are obtained in step 12 so that in step 20, the called person's first name can be used when the message is transmitted in steps, 30, 34 and 36.

Part of step 20 includes a decision (not shown for clarity) whether to obtain a first name or a last name. In the preferred embodiment, common names are stored in the data base 22 of recorded voice phrases. Whether a name is "common" and therefore in the third data base 22 will depend on various factors including the statistical frequency at which a name is used in a population. So-called "recurring" identifiers, i.e., those that appear over some determined number of times, are considered "common." Some people can have a common first name, but an uncommon last name. Other people can have a common last name but an uncommon first name. Yet other people might have uncommon first and last names or common first and last names. In step 20, the most common of two or more names of a person is selected for use in the subsequent steps. If a last name of a person is located but no first name, the message that is assembled in step 30 will be selected as one to be used when addressing a person by last name. If a first name of a person is located in step 20 but no last name, the message assembled in step 30 will be selected as one to be used when addressing a person by first name.

As is well-known, many people initiate speech to an answering machine or voice mail system with the term "hello" or other salutation, followed by an identifier for the person being called, followed by the content or information of their message. An exemplary sequence or template of utterances of a person leaving a message can be represented as follows:

<SALUTATION><IDENTIFIER><CALLER IDENTIFIER><MESSAGE CONTENT>

The words "hello," "greetings," and "hi" are common salutations that many people use in the course of leaving a voice message. The called party's first name is an identifier obtained in step 12 of FIG. 1.

Most people identify themselves to a called party, before they leave the substance of their message. The aforementioned "caller identifier" utterance represents that a caller might identify himself or herself to the called party, before leaving the "message content" utterance. The "caller identifier" utterance can be part of the "message content" utterance, but it can also be a separate wav file that is inserted or "dropped in" to the concatenated data files in order to customize or more realistically impersonate a person's actual speech.

Using the foregoing template, a first person can be impersonated as calling a second person by playing an audio signal created from a file that is a digitization of the first person speaking the word "hello" followed by an audio signal created from another file that is a digitization of the first person speaking a name for the person being called.

For example, a candidate can record himself speaking a common name, as he might do when placing a call to such a person. As the candidate pronounces a name, it is recorded, then digitized and stored. By recording hundreds or even thousands of names, a library or data base of recorded names, corresponding with the names of the individuals to be called, can be used to impersonate the candidate speaking to the called party.

A drop-in can also be added to a digitized message that has been stored in the content message data base 32. An example of such a drop in would include a date/time drop in by which the output audio signal in the calling person's voice also included the calling person "stating" the current date and/or time on which the call was actually made. Adding such a drop in message increases the likelihood that the called party will believe that a live call has actually been placed by the calling party.

It should be apparent from the foregoing that a candidate for political office can record himself saying various salutations, such as "hello" or "greetings" or "hi." In addition, the candidate can record himself identifying himself and can also record himself delivering a voice mail message to prospective voters on issues in the impending election.

Once the aforementioned data files are created and stored, they can be strung together in sequence according to predetermined rules of usage such that when they are used to create an audio signal, they sound as if they were spoken or uttered in real time by the person whose voice was recorded, digitized and the samples stored. Such a message can include a salutation from the calling party such as "hello" followed by an appropriate greeting, such as "mister smith." An identifier, e.g., "this is Senator Bill Stephens" that either precedes or which forms part of the message, can all be strung together and transmitted to the voice mail, answering machine or even to a live person.

After a salutation is rendered by the computer, e.g., "Hello" and after the called person's name is rendered by the computer "John" the calling party can identify himself to the called party, e.g., "this is Senator Bill Stephens" using a pre-recorded drop-in file that is a representation of Senator Bill Stephens, in his own voice. The "message content" can follow the "caller identifier" audio to make the call sound realistic as if it had been left by the person in whose voice the audio messages were left, or at least an impersonator of the actual person in whose voice the audio files were made.

In order to render life-like voice from the data files stored in the various data bases, salutations, identifiers, caller identifiers and message content files have to be presented as if they were being uttered by the person in whose voice they were made. If for example the aforementioned "recorded voice phrases" of a computer generated impersonation were a well-known celebrity or a well-known political office holder or a candidate for political office, the manner in which the data files are strung together will require timing and level control to faithfully impersonate the calling person.

In the preferred embodiment, the delivery of various utterances from data files is governed by various "rules" that specify various parameters that help to make computer-generated speech sound more life-like. A speaker's cadence is but one characteristic that is accommodated using "rules" that determine how a simulated voice can impersonate a live person.

"Rules" are used to specify the delivery of audio in order to make the audio signal sound more lifelike. "Rules" can also be used to identify which message to deliver from a plurality of pre-recorded and digitized message content.

A feature of the disclosed and claimed invention is the ability to select a message content based on the identifier and/or demographic characteristics. For example, a celebrity whose voice is well known can record a message for one particular company in one geographic area but record a separate message for advertising targeted for the same company in a different region. Being able to build customized messages from stock data files greatly enhances the ability to deliver customized messages that accurately imitate a person.

Further described features include the ability to select a message content based on the call recipient's response to individual survey questions. For example, a politician may record a survey question asking if the recipient plans to vote for him. If the survey recipient responds with a key press corresponding to "yes, I plan to vote for you" the subsequent voice message may include message content such as "thanks so much for your support." Instead, if the survey recipient indicates they do not plan on voting for the politician, the subsequent voice message may include message content such as "I'm sorry I haven't earned your vote yet, but please let me know how I can gain your trust."

Combining the ability to select a message content based on the identifier and/or demographic characteristics with the ability to select a message content based on the call recipient's response to individual survey questions provides extremely relevant content. For example, in the example above, if the survey recipient happens to be a senior citizen and they indicate they do not plan on voting for the politician, the subsequent voice message may include message content such as "I'm sorry I haven't earned your vote yet, but I am working hard to keep health care costs low for seniors."

Being able to build customized messages from stock data files which correspond to possible survey questions greatly enhances the ability to deliver customized voice surveys that accurately imitate a live person. In receiving a first person indicated specific response to the concatenated data file, further concatenated data files may generate voice messages to be conveyed to the first person providing an additional personalized voice message based on the first person indicated specific response. At the conclusion of the voice message, the first person indicates a specific response to the voice message by pressing buttons on the telephone key pad or other interface. Based on the responses of the first person, additional personalized voice messages are transmitted which are substantially identical to the second person speaking to the first person, based on the specific responses indicated by the first person. Subsequent survey questions are personalized based on identifiers and recipients' previous responses. Accordingly signals are generated from concatenated recorded phrases and response messages, which are unique for each potential response. Upon indicating a specific response by pressing a button on the telephone key pad or other interface, the first person may further speak a message which is recorded by a computer. Moreover the first person speaking a message responsive to a prompt may be recorded by a computer being available for review by a third party. These messages may be subsequently forwarded to the third party via a telephone broadcast voice message. The event of the person logging into a specific website or clicking a link on a website or in an email can be substituted for dialing the person's phone number.

For example, if the person is on a website completing a purchase, a button may be presented asking if they are willing to take a survey. Upon clicking a link to indicate they will take the survey, the "call is placed" over the Internet from the website to the person's computer and the process continues in the same manner as described when a telephone call is placed. In this case, identifiers of the person may include a specific product that the person just purchased. For instance, the variable voice survey may begin with "Hi Steve. Thanks so much for purchasing the book Lord of the Rings. If you would like to hear about other books from this author, please click YES now."

As described the ability to select message content in the voice of a third person, e.g., a survey question may be recorded in the voice of a female voice talent asking if the recipient plans to vote for one of many politicians. If the survey recipient responds with a key press indicating they are voting for a particular politician, the subsequent voice message may include message content recorded in the voice of that particular politician. In this embodiment, the second person is the female voice talent and the third person is the individual politicians whose voice content has been pre-recorded.

While the embodiment described above contemplates placing calls one-at-a-time, at least one alternate embodiment includes the step of calling multiple persons at the same time, from a phone listing.

Instead of identifying a single person in step 12, multiple parties to be called in step 12 by different identifiers. For example, step 12 can identify all male voters in a certain geographic region, whose name is "John Doe." Upon a determination that there are multiple "John Does" phone numbers for "John Doe" can be retrieved in step 16 followed by the retrieval of a data file for the name "John" or "Doe" or "John Doe."

In steps 24, 26 and 28, calls are placed to several different "John Does." As the calls are answered, the same message, e.g., "hello" "John Doe" "this is Senator Bill Stephens calling . . . " is transmitted to each phone number. A drop-in date and/or time adds realism to the call as does a content message that is focused to the "John Does" that were called.

It should be apparent from the foregoing that the invention disclosed and claimed herein can be used to automatically place phone calls to prospective voters or constituents of elected officials. As such, it can be a valuable campaign tool by automatically placing calls, which upon receipt, generates an impersonation of a candidate speaking to a voter or constituent using the first-person, i.e., addressing a person by name by the calling person.

While actual speech is preferred, those of skill in the art will appreciate that a candidate's voice or a celebrity's voice can be impersonated. The data files of recorded voice phrases and the data files of message content can therefore be pre-recorded albeit using an impersonation of a person who is supposed to be speaking. When the various data files are concatenated and played back, the resultant audio might be a sufficiently accurate reproduction of the calling party to quell suspicion that the call was computer generated.

Celebrity voices or impersonations thereof can be used as well. Similarly, the content message to be delivered can be a commercial message as well as a public service message.

The concatenation of wav files or other types of audio files to replicate a celebrity speaking to a person by name can be effective.

While the preferred embodiment used wav files to store and produce analog audio signals, other file types can be concatenated as well. Some file types include those listed in Table 6 below. For claim construction purposes, the term "data file" should be construed to include any one or more of the file types in Table 6 as well as the wav files mentioned above.

TABLE 6

8-bit signed SAM (.sam)
64-bit doubles RAW, DBL (.raw, .dbl)
A-Law and mu-Law (.wav)
ACM waveform (.wav)
Amiga IFF-8SVX (.iff, .svx)
Apple AIFF (.aiff, .aif, .snd)
ASCII Text Data (.txt)
AVR (.avr)
Cool Edit or Audition Loop (.cel)
Compact Disc Audio (.cda)
Creative Sound Blaster (.voc)
Dialogic ADPCM (.vox)
DiamondWare Digitized (.dwd)
Dolby AC3 (.ac3)
DVI/IMA ADPCM (.wav)
GSM 6.10: (.gsm, .au.gsm)
Microsoft ADPCM (.wav)
MP3 (.mp3)
MP3PRO (.mp3)
MPEG audio, layer 1, 2, or 3 (.mpa, .mp, .mp2, .m1a, .m2a, .mpg, .mpeg, .swa)
NeXT/Sun platforms (.au, .snd)
May include
Mu-Law 8-bit, A-Law 8-bit,
G.721 ADPCM 4-bit, and Linear PCM
PARIS: (.paf)
PSION sound: (.wve)
PCM, RAW Data (.pcm, .raw)
QuickTime Movie (.mov)
Turtlebeach SampleVision (.smp)
Windows Media Audio 9 (.wma)
Windows Media Audio 9 Professional (.wmp)
Windows PCM-6 channel (.wav)
Windows Pulse Code Modulation (PCM) data (.wav)
Macromedia/Adobe Flash (.swf)

Figure 2:
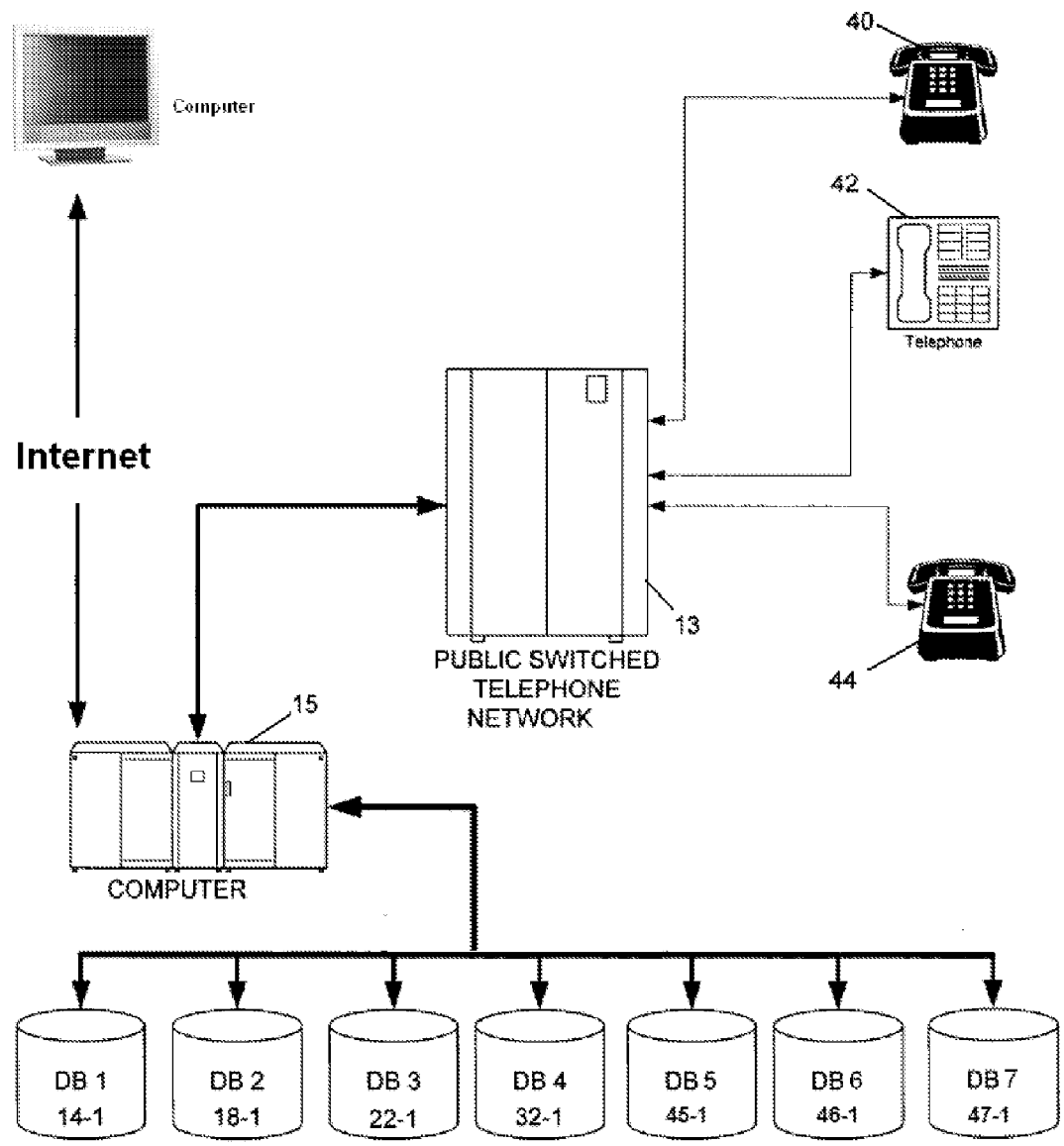
FIG. 2 is a block diagram of an apparatus operatively coupled with several different data storage devices for simulating a live person delivering a voice survey by concatenating audio files and generating audio from them for implementing the flow charts of FIGS. 1A, 1B and 1C with a system according to the present inventions.

FIG. 2 depicts an apparatus for delivering a telephone message to a first person, at a first telephone number, in the voice of a second person. A computer 15 is operatively coupled to four different storage devices, identified by reference numerals 14-1, 18-1, 22-1 and 32-1 corresponding to the four data bases DB 1, DB 2, DB 3 and DB 4 above. Further a fifth data base 45-1 stores the key press responses, a sixth data base 46-1 stores the recorded voice messages of each recipient, and a seventh data base 47-1 is provided for recipient messages, DB 5, DB 6 and DB 7 respectively.

The first storage device 14-1 stores a data base DB 1 that includes the names or other identifiers of persons to be called. The second storage device, 18-1, stores a data base DB 2 of telephone numbers for each of the persons in the first data base DB 1. A third storage device 22-1 stores data files consisting of recorded voice phrases, each of which is a digitization of a person speaking content corresponding to the identifiers in the first data base DB 1. A fourth storage device stores a fourth data base of digitized content messages to be delivered to a person being called.

The computer 15 is shown coupled to the public switched telephone network or PSTN 13. When a phone number is determined from the second data base 18-1, the computer 15 can place a call to that phone number by generating the DTMF tones of the phone number and sending the tones to the PSTN. Of course, a communication other than the PSTN could be used as well. For purposes of claim construction, a "communication network" should be construed to include the PSTN but also include cellular and the Internet over which voice communication can occur via VoIP.

As set forth above, when a call placed to one or more phones 40, 42 and 44 is answered, program instructions stored in the memory of the computer 15 cause the computer to perform the steps shown in FIG. 1 In other words, the stored program instructions cause the computer to obtain a phone number of an identified person; obtain the recorded voice phrases in the data base 22-1 corresponding to the person having the phone number, concatenate the recorded voice phrases with one or more content message files from the fourth data base 32-1 and produce a voice message that sounds as if it is spoken by the second person and addressing the first person directly.

It should be apparent that by using the foregoing method and apparatus, a variable data voice survey can be delivered to a person, which sounds as if the survey were personally directed to the recipient. When the audio files from which the survey is created are in the voice of a celebrity or other known person, such as a candidate for office, the survey delivered by the system have a significantly greater impact on the recipient that prior art computer-generated surveys. From the foregoing, it can be seen that there has been provided features for improved variable data voice survey and recipient voice message capture systems and methods. While a particular embodiment of the present invention has been shown and described, it will be obvious to those skilled in the art that changes and modifications may be made without departing from the invention in its broader aspects. Therefore, the aim is to cover all such changes and modifications as fall within the true spirit and scope of the invention. The matter set forth in the foregoing description and accompanying drawings is offered by way of illustration only and not as a limitation. The actual scope of the invention is intended to be defined by subsequent claims when viewed in their proper perspective based on the prior art.

What is claimed is:

1. A method of automatically delivering an audio survey to a first person in a voice of a second person by concatenating digital files, a content of which are digital representations of the second person's voice, such that an audio signal is produced from the concatenated files, which is substantially identical to the second person speaking to the first person, the method comprising:
obtaining at least one identifier and a phone number of a first person;
obtaining a first data file the contents of which is a digitization of the second person speaking a recorded voice message relating to the identifier of the first person;
automatically originating a telephone call to a called number from a computer, the called number comprising the phone number of the first person, wherein automatically originating the telephone call from the computer includes originating a plurality of calls to a plurality of phone numbers substantially simultaneously;

detecting the telephone call answered by the first person;

transmitting an analog signal generated to the called number by concatenating the first data file with a second recorded voice message data file and generating an audio signal therefrom as a concatenated data file comprising a digitization of a voice message to be conveyed to the first person, the concatenated data file comprising digitized speech of the second person such that the audio signal generated from the concatenated file being substantially identical to the second person's voice directed to the first person, wherein the step of transmitting to the called number includes the step of transmitting the analog signal to the plurality of the called numbers that are answered;

receiving a first person indicated specific response to the concatenated data file comprising the digitization of the voice message;

transmitting a further concatenated data file by concatenating the first data file with a third recorded voice message data file and generating an audio signal therefrom as a voice message to be conveyed to the first person providing an additional personalized voice message based on the first person indicated specific response; and recording the first person speaking a message responsive to a prompt therefore, the messages which are recorded by computer being available for review by a third party.

2. The method of claim 1, wherein the receiving a first person indicated specific response comprises a first person user interface input by pressing buttons on the telephone key pad, voice command input or first person device input interface.

3. The method of claim 1, wherein additional personalized voice messages are transmitted in the form of survey questions based on the specific responses indicated by the first person following each question, including a step of concatenating a digitized speech file that represents the second person enunciating a phrase which corresponds to each unique response.

4. The method of claim 1, wherein additional personalized voice messages are transmitted in the form of survey questions based on the specific responses indicated by the first person following each question, including a step of concatenating a digitized speech file that represents a third person enunciating a phrase which corresponds to each unique response.

5. The method of claim 1, wherein first person indicates a specific response by pressing a button on the telephone key pad or other interface and speaks a message which is recorded by a computer.

6. The method of claim 1, wherein the messages which are recorded by each first person are later made available for review by a third party, wherein the messages are subsequently forwarded to the third party via a telephone broadcast voice message.

7. The method of claim 1, wherein the messages which are recorded by each first person are later made available for review by a third party, wherein the messages are posted to a website and can be played on the third party's computer.

8. The method of claim 1 wherein the step of obtaining at least one identifier of a first person includes a step of obtaining a person's name from a data base, wherein the identifier is a reoccurring identifier for a plurality of persons.

9. The method of claim 8 wherein the step of determining a name includes a step of determining the name to be a common first name or a common surname.

10. The method of claim 1 wherein the identifier is at least one of:
a common name;
a demographic characteristic;
a political party affiliation or membership;
affiliation with a particular religion;
a voting history; a geographic area;
an affiliation with or to an organization, corporation or group;
a purchase of a particular product or service;
an affiliation as a constituent to a sitting political office holder; and
a known interest or hobby.

11. The method of claim 1 wherein the step of generating an analog signal by a computer, includes the step of: concatenating data files of digitized speech according to predetermined rules on how the identifier should be rendered as speech of the second person.

12. The method of claim 1 wherein the step of, transmitting to the called number, an analog signal generated by a computer from at least first and second concatenated data files, includes a step of concatenating a digitized speech file that represents the second person enunciating a salutation.

13. The method of claim 1 wherein the second and third recorded voice message data files comprise a multiplicity of data files, each of which produces a different audio signal that conveys different content.

14. The method of claim 1 wherein automatically originating a telephone call includes originating a plurality of calls to a plurality of phone numbers substantially simultaneously and wherein the step of transmitting to the called number, an analog signal includes the step of transmitting the analog signal to a plurality of the called numbers that answered.

15. The method of claim 1 wherein the second person is a candidate for political office.

16. The method of claim 15 wherein at least one of a first and second concatenated data files is a digitization of a political message, spoken by a political candidate, such that the audio electrical signal produced at the called phone number by the concatenated data files replicates a voice of the political candidate speaking to the first person.

17. The method of claim 15 wherein at least one of the first and second concatenated data files is a digitization of a political message spoken using a voice that is substantially identical to the voice of a political candidate such that the audio electrical signal produced at the called phone number by the concatenated data files substantially replicates the voice of the political candidate, speaking to the first person.

18. The method of claim 16 wherein at least one of the first and second concatenated data files is a digitization of a commercial message spoken using a voice that is substantially identical to a voice of the celebrity such that the audio electrical signal produced at the called phone number by the concatenated data files substantially replicates the voice of the celebrity, speaking to the first person.

19. The method of claim 1, wherein at least one of a first and second concatenated data files is a digitization of a commercial message, spoken by the celebrity, such that the audio electrical signal produced at the called phone number by the concatenated data files replicates a voice of the celebrity speaking to the first person.

20. The method of claim 1, wherein a first data base of persons is a data base of voters or prospective customers.

21. The method of claim 1, wherein said analog signal is generated from the digitization of the voice message by concatenating the first data file and the second data file and generating the audio signal from the concatenated data files substantially identical to the second person, the speech of the second person representing an individual, celebrity, political office holder, or candidate addressing the first person directly in a live call delivered in its entirety as a single personalized, life-like telephone survey.

22. The method of claim 1 wherein the step of automatically originating a telephone call includes placing a telephone call using cellular or other wireless communication service.

23. The method of claim 1 wherein the step of automatically originating a telephone call includes a step of placing a telephone call using Voice Over Internet Protocol.

24. The method of claim 1 wherein the step of automatically originating a telephone call includes determining a time of day when a telephone call is expected to be directed to a voice recording device.

25. An apparatus for delivering a variable data voice survey to a first person in the voice of a second person and allowing the first person to indicate a specific response by pressing a button on the telephone key pad or other interface and allowing the first person to speak a message which is recorded by a computer comprising:
   a computer that is operatively coupled to:
   a) a first data base having identifying characteristics of at least a first person and a phone number associated with the first person comprising common identifiers of each person to be called;
   b) a second data base of recorded voice phrases comprising digital audio files, each digital audio file being a digitization of the second person speaking phrases associated with the identifying characteristics of the first person wherein common identifiers of the first data base are matched with the recorded voice phrases, each of which is a digitization of the individual speaking content corresponding to the common identifiers;
   c) a communication network;
   d) a third data base, storing at least one second audio file, which is a digitization of a voice message, spoken by the second person; and
   e) a forth data base, storing at least one third audio file, which is a digitization of a voice message, spoken by the second person, or a third person, corresponding to each unique response;
   f) a fifth data base, storing the key press responses;
   g) a sixth data base storing the recorded voice messages of each recipient;
   h) memory, storing computer program instructions, which when they are executed, cause the computer to:
      i) determine if there is a digitization of the phrases associated with the identifying characteristics of the first person;
      ii) if there is a digitization of the phrases associated with the identifying characteristics of the first person, then concatenate the first digital audio file with the second audio file;
      iii) generating a voice message from the first digital audio file and the second audio file to produce a voice message that sounds as if it is spoken by the second person and addressing the first person directly;
      iv) at the conclusion of the voice message, the first person indicating specific responses by pressing a button on the telephone key pad or other interface
      v) generating a subsequent voice message from the first digital audio file and the second audio file and the third audio file to produce a voice message that sounds as if it is spoken by the second person and addressing the first person directly, including the identifying characteristics of the response;
      vi) at the conclusion of all subsequent voice messages, the first person indicating a specific response by pressing a button on the telephone key pad or other interface, and speaking a message which is recorded by a computer;
      vii) storing the key press responses of each first person in a fifth database;
      viii) storing the voice messages recorded by each first person in a sixth database and subsequently providing access to the recorded messages for review by a third party.

26. A method of automatically delivering an audio survey to a first person in a voice of a second person by concatenating digital files, a content of which are digital representations of the second person's voice, such that an audio signal is produced from the concatenated files, which is substantially identical to the second person speaking to the first person, the method comprising:
   obtaining at least one identifier of a first person from a data base;
   obtaining a phone number for the first person from a data base;
   obtaining from a data base, a first data file, the contents of which is a digitization of the second person speaking a recorded voice message relating to the identifier of the first person;
   automatically originating a telephone call from a computer, to a called number at the phone number for the first person;
   detecting by a computer, the telephone call as being answered;
   after the telephone call is answered, transmitting to the called number, an analog signal generated by a computer, by concatenating the first data file and a second recorded voice message file and generating an audio signal from the concatenated data files, the second data file being a digitization of a voice message to be conveyed to the first person, the concatenated data files being digitized speech of the second person such that the audio signal generated from the concatenated files is substantially identical to the second person's voice directed to the first person, wherein automatically originating a telephone call from a computer includes originating a plurality of calls to a plurality of phone numbers substantially simultaneously and wherein the step of transmitting to the called number, an analog signal includes the step of transmitting the analog signal to a plurality of the called numbers that answered;
   at the conclusion of the voice message, the first person indicates a specific response to the voice message by pressing buttons on the telephone key pad or other interface;
   based on the responses of the first person, additional personalized voice messages are transmitted which are substantially identical to the second person speaking to the first person, based on the specific responses indicated by the first person;
   upon indicating a specific response by pressing a button on the telephone key pad or other interface, the first person speaks a message which is recorded by a computer; and
   recording messages by each first person and making the recorded messages available for review by a third party.

27. A method of automatically delivering an audio survey to a first person in a voice of a second person by concatenating digital files, a content of which are digital representations of the second person's voice, such that an audio signal is produced from the concatenated files, which is substantially identical to the second person speaking to the first person, the method comprising:

obtaining a first data file the contents of which is a digitization of the second person speaking a recorded voice message relating to the identifier of the first person;

automatically originating a transmission from a computer;

generating an analog signal to the first person by concatenating the first data file with a second recorded voice message data file and generating an audio signal therefrom as a concatenated data file comprising a digitization of a voice message to be conveyed to the first person, the concatenated data file comprising digitized speech of the second person such that the audio signal generated from the concatenated file being substantially identical to the second person's voice directed to the first person;

receiving a first person indicated specific response to the concatenated data file comprising the digitization of the voice message; and transmitting a further concatenated data file by concatenating the first data file with a third recorded voice message data file and generating an audio signal therefrom as a voice message to be conveyed to the first person providing an additional personalized voice message based on the first person indicated specific response.

28. The method of claim 27, wherein the receiving a first person indicated specific response comprises a first person user interface input by clicking input on a web site via first person device input interface, upon clicking a link to indicate they will take the survey via the Internet from the website to the first person's computer.

29. The method of claim 27, comprising recording the first person speaking a message responsive to a prompt therefor, the messages which are recorded by computer being available for review by a third party.

30. The method of claim 27, wherein the generating an analog signal to the first person comprises a call placed by Voice Over Internet Protocol (VoIP) upon clicking a link, taking the survey via the Internet from the website to the first person's computer.

\* \* \* \* \*